Figures 1, 2:
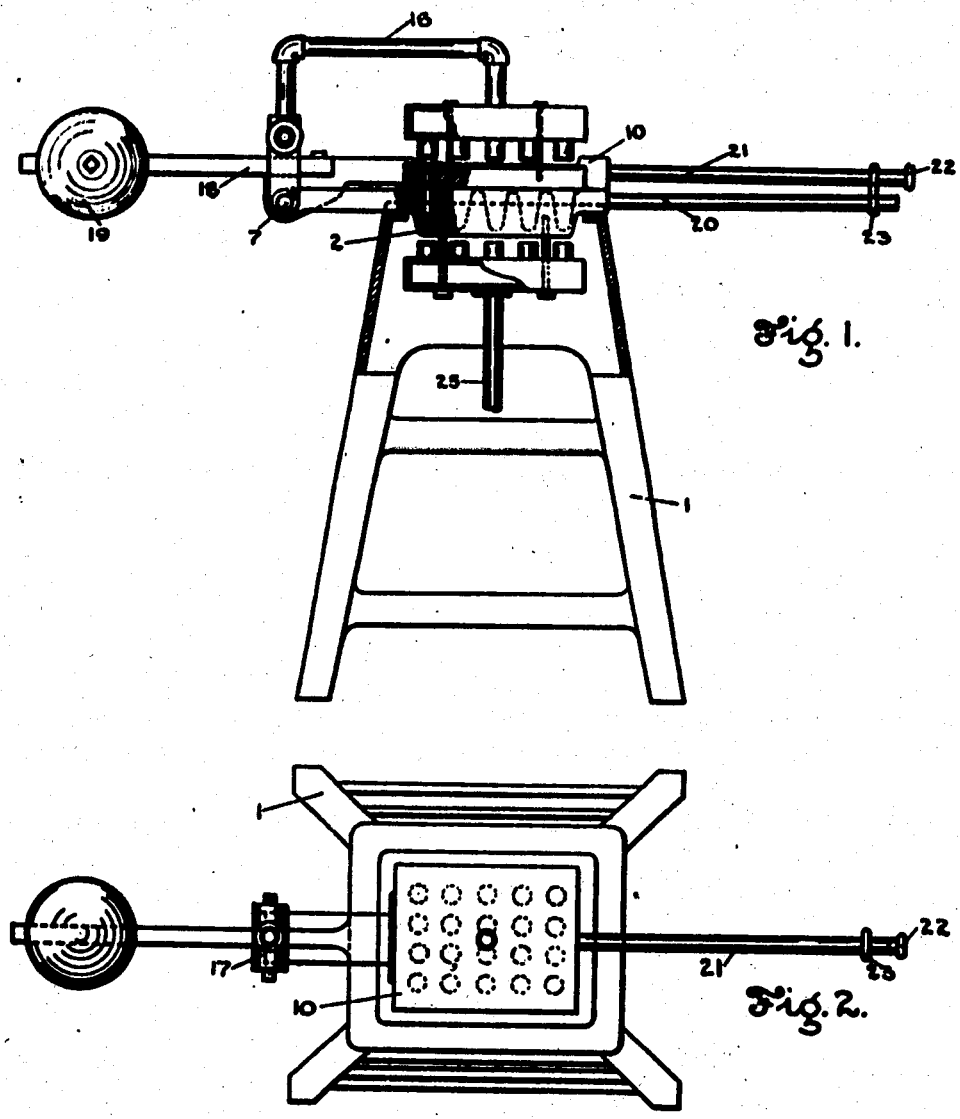

L. W. PARTRIDGE.
MOLDING AND BAKING MACHINE.
APPLICATION FILED APR. 27, 1909.

974,705.  Patented Nov. 1, 1910.
2 SHEETS—SHEET 1.

Witnesses:—

Inventor
Lambert W. Partridge
Stewart & Stewart
Attorneys.

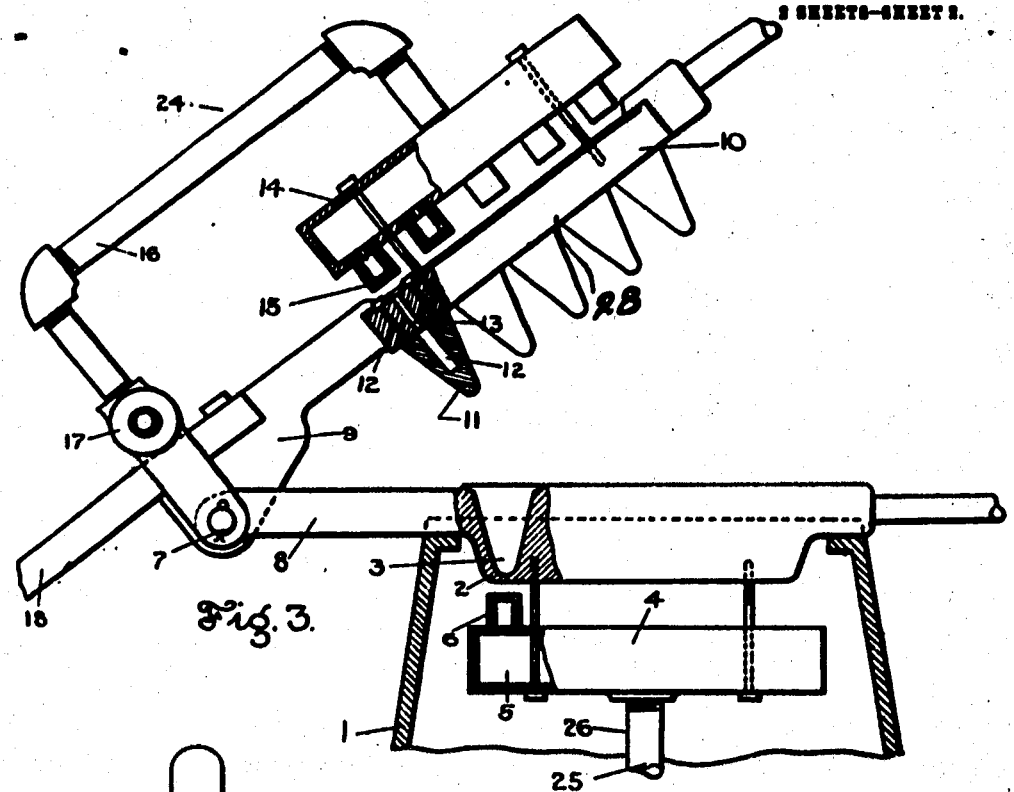
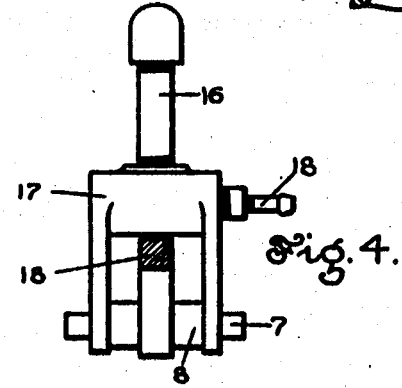
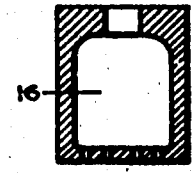

UNITED STATES PATENT OFFICE.

LAMBERT W. PARTRIDGE, OF BALTIMORE, MARYLAND, ASSIGNOR TO FLYNN & EMRICH COMPANY, OF BALTIMORE, MARYLAND, A CORPORATION OF MARYLAND.

MOLDING AND BAKING MACHINE.

974,705.　　Specification of Letters Patent.　　Patented Nov. 1, 1910.

Application filed April 27, 1909. Serial No. 492,488.

*To all whom it may concern:*

Be it known that I, LAMBERT W. PARTRIDGE, a citizen of the United States of America, residing at the city of Baltimore, State of Maryland, have invented certain new and useful Improvements in Molding and Baking Machines, of which the following is a specification.

This invention relates to machines for molding and baking pastry receptacles, particularly those known as ice-cream cones, and has as an object the production of a machine of efficiency increased over that of the machines in use, as hereinafter described.
Numerous machines for this purpose have been built and are known to the trade. They consist of an external mold apertured to form one or more conical openings and an internal mold or former movable relatively to the external mold. The former consists of a number of cones corresponding to the number of conical apertures and adapted to be inserted therein, leaving a suitable space between the two molds identical in shape with the receptacle to be formed. In the most of these machines the external mold is stationary and heated by a suitable burner. In such machines the internal mold or former is not heated during baking but is expected to transmit merely the radiant heat supplied to it from the external mold between bakings. Other machines have been made in which the internal molds are hollowed out to permit heating from within.
Such machines are provided with a stationary heating source and the two molds have a ball and socket joint so that they may be raised in unison and rotated to expose either side; *i. e.,* first the mold and then the former, to the heat. These machines are objectionable for the reason that, on account of the weight, but few cones can be handled and, further, in that entire uniformity of heating of the molds does not result. None of these machines have means for heating the molds uniformly, both during baking and filling, and as a result, sticking of the dough, burning of the product and uneven cooking result.
The machine herein shown and described and in connection with which the applicant's invention has been reduced to practice is of the type provided with a stationary mold and a former mounted on the frame of the stationary mold so that it may be reciprocated relatively thereto to move the forming cones into and out of molding position in the molding cones. However, this arrangement of the features of the machine is not essential to the operation of the invention. The forming cones are apertured to permit heating from within and a suitable burner or other heating means is secured to the formers, preferably with one heating unit opposite the aperture of each cone and disposed toward the same so as to heat the interior of the cone. Any suitable means may be provided for heating the stationary mold.

Aside from the above features, the applicant's invention resides in other details of the machine and particularly in the means for locking the molds in baking position.

The accompanying drawings illustrate a molding and baking machine to which my invention has been applied.

Figure 1 is an elevation of the machine, partly in section: Fig. 2 is a plan: Fig. 3 is an enlarged view of the molds, partly in section: Fig. 4 is a rear view of the hinged fuel pipe; Fig. 5 is a detail of a burner.

The machine consists of a stationary frame 1 on which is mounted the external mold 2 consisting of a block of metal apertured to form a number of conical openings 3. This mold may be heated by any suitable burner 4 or other heating means. As shown, the burner comprises a chamber 5 having a number of jets or burners proper 6, one for each conical opening 3. The burner is provided with a gas supply pipe 25 in which is a regulating valve 26. The frame has a horizontal stud 7 mounted on a suitable bracket 8, and the stud 7 forms the pivot of an arm 9 which carries the movable internal mold or former 10. The former 10 is provided with a number of forming cones 11 corresponding to the conical openings 3 and similarly placed so as to register therewith when the mold is closed. The cones 11 are preferably made separate from the former plate 28 and secured thereto by a suitable means, as screws 12. The forming cones 11 are apertured longitudinally at 12 and suitable apertures 13, shown as of less diameter, are made in the former plate 28, passing through the latter from its upper surface and terminating in the aperture 12 of the forming cones.

A suitable heater which may be in the form of a burner 14, similar to the burner 4 of the stationary mold, is secured to the former 10 and preferably spaced therefrom a slight distance to permit circulation of air. The burner 14 is supplied with a plurality of nozzles or jets 15, one for each cone, the jets being disposed toward the openings 13 to direct the flame into the aperture 12. A fuel pipe 16 leading to the burner 14 is secured to the arm 9 in any suitable manner and is shown as terminating in a T 17 having a nozzle 18 to which may be secured any desirable flexible connection. The pipe 16 may be provided with a regulating valve 24 to control the supply of fuel.

An arm 18, secured to the former 10, extends beyond the pivot 7 and is provided with an adjustable counter-weight 19. At the front of the machine the stationary mold has a horizontal arm 20 extending outward toward the operator, and the former 10 is provided with a corresponding arm 21 overlying the arm 20 and inclined forwardly toward the latter. The upper arm may be slightly longer than the lower and provided with a head 22. A link 23 normally hangs from the upper arm and is prevented from being detached by the head 22. This link is of sufficient length to inclose the arms 20 and 21 near their outer extremity, but is of less internal diameter than the distance between the remote lateral surfaces of the arms 20 and 21 at a point nearer the molds, so that when it is desired to close the machine to baking position and press the molds together, the link is caused to inclose both arms and is pushed toward the machine until the desired tension results.

The operation of the machine is quite apparent from the description of its features, together with the preliminary statement of its function. The burners are lighted and the heat of the molds regulated to the desired degree. The former 10 is rotated upward about its pivot by the operator who grasps the arm or handle 21. The amount of dough necessary to form a single cone is placed in each of the apertures 3 of the stationary molds 2. The former 10 is then lowered, the forming cones 11 entering the apertures 3. The cones displace the dough in the apertures and cause it to be distributed throughout the space which occurs between the formers and the molds. To give the required pressure to accomplish this result, the link 23 is passed over the arm 20 and driven up toward the machine. The period of baking is determined by experiment. At the end of this period, the molds are unfastened by sliding the link forward, the former 10 is raised, the cones are removed by means of the connecting dough which ordinarily spreads over the entire top surface of the stationary mold.

By means of the device as described, absolutely even baking of the cones results and no loss occurs through burning, or failure to bake sufficiently, and as the cones are not burned and are always sufficiently baked, sticking of the dough does not result.

Having thus described my invention, what I claim and desire to secure by Letters Patent is:

In a machine for molding and baking ice cream cones, a conical mold, means for heating the mold, a corresponding hollow conical former mounted to reciprocate into and out of the mold, and a burner secured to the former, the aperture of the burner disposed toward the hollow to direct a flame into the former to heat it uniformly from within.

Signed by me at Baltimore, Maryland, this 26th day of April 1909.

LAMBERT W. PARTRIDGE.

Witnesses:
 EDWARD L. BASH,
 JOSEPH B. BEAM.